Sept. 7, 1943.  G. H. GILL  2,328,897
AIRPLANE FLAP OPERATING MEANS
Filed Feb. 23, 1942  2 Sheets-Sheet 1

Inventor
GEORGE HERBERT GILL

Attorney

Sept. 7, 1943. G. H. GILL 2,328,897
AIRPLANE FLAP OPERATING MEANS
Filed Feb. 23, 1942 2 Sheets-Sheet 2

Inventor
GEORGE HERBERT GILL
By
Attorney

Patented Sept. 7, 1943

2,328,897

UNITED STATES PATENT OFFICE 2,328,897

AIRPLANE FLAP OPERATING MEANS

George Herbert Gill, Manhattan Beach, Calif., assignor to The Garrett Corporation, Airesearch Manufacturing Company Division, Inglewood, Calif., a corporation of California Application February 23, 1942, Serial No. 431,967

8 Claims. (Cl. 254—103)

My invention relates to a device of the general character of a screw jack which has self-contained power means for its operation and is of such compact size and arrangement that it may be readily installed at various places in an aircraft where power movement of a part or member is required.

It is an object of the invention to provide an actuating device having a supporting structure which may be in general referred to as a casing, which may be secured to a stationary part of an aircraft, and a projecting member equipped so that it may be connected to a part of the aircraft which is to be moved, the support or casing having power means which may be actuated so as to cause outward and inward movement of the projecting member, which movement is transmitted to the part to be actuated.

It is an object of the invention to provide a device of this character having a support or body structure, referred to in general as a casing, a shaft member and a motor supported with their axes in spaced relation, with reducing gear means between the motor shaft and the shaft member, which reducing gear means includes a diagonally disposed spindle which may be easily installed. In the device the shaft member projects from the casing and has its projecting portion threaded for engagement with an axially movable threaded member which is connected to the part to be moved.

It is an object of the invention to provide a power operated actuating device of the general character described in the foregoing, having a control member, such as a switch for control of the motor, and a control shaft projecting through the wall of the casing, there being reduction gear means in the casing so that the control shaft will be rotated at reduced speed and in proportion to the rotational movement of the shaft member.

A further object of the invention is to provide a device of the general character described in the foregoing, having a casing with a projecting shaft member in threaded engagement with an axially movable thrust member, with means at the outer end of this thrust member for pivotally connecting it to a part which is to be moved, and pivotal connecting means on the casing substantially aligned with the projected axes of the shaft member and thrust member.

Further objects and advantages of the invention will be brought out in the following part of the specification.

Referring to the drawings which are for illustrative purposes only,

Figure 1:
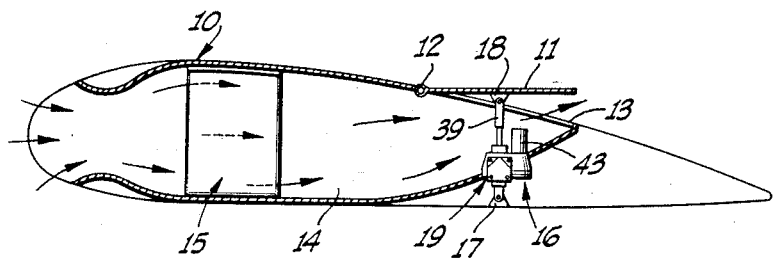
Fig. 1 is a view showing a preferred embodiment of the actuating device as used in the wing of an aircraft to move a flap.

In Fig. 1 I have diagrammatically shown the cross section of a wing 10 having a flap 11 swingable on a hinge 12 so as to open and close the rear port 13 of an air passage 14, in which an oil cooler 15 is placed. The flow of air through the passage 14, and accordingly through the cooler 15, is controlled by the position of the flap 11. In Fig. 1 I have shown my actuating device 16 connected by means of a bracket 17 to the wing structure and by means of a bracket 18 to the under side of the flap 11. The actuating device 16 is shown in a state of operation wherein the flap 11 is held in a partly raised position.

Figure 2:
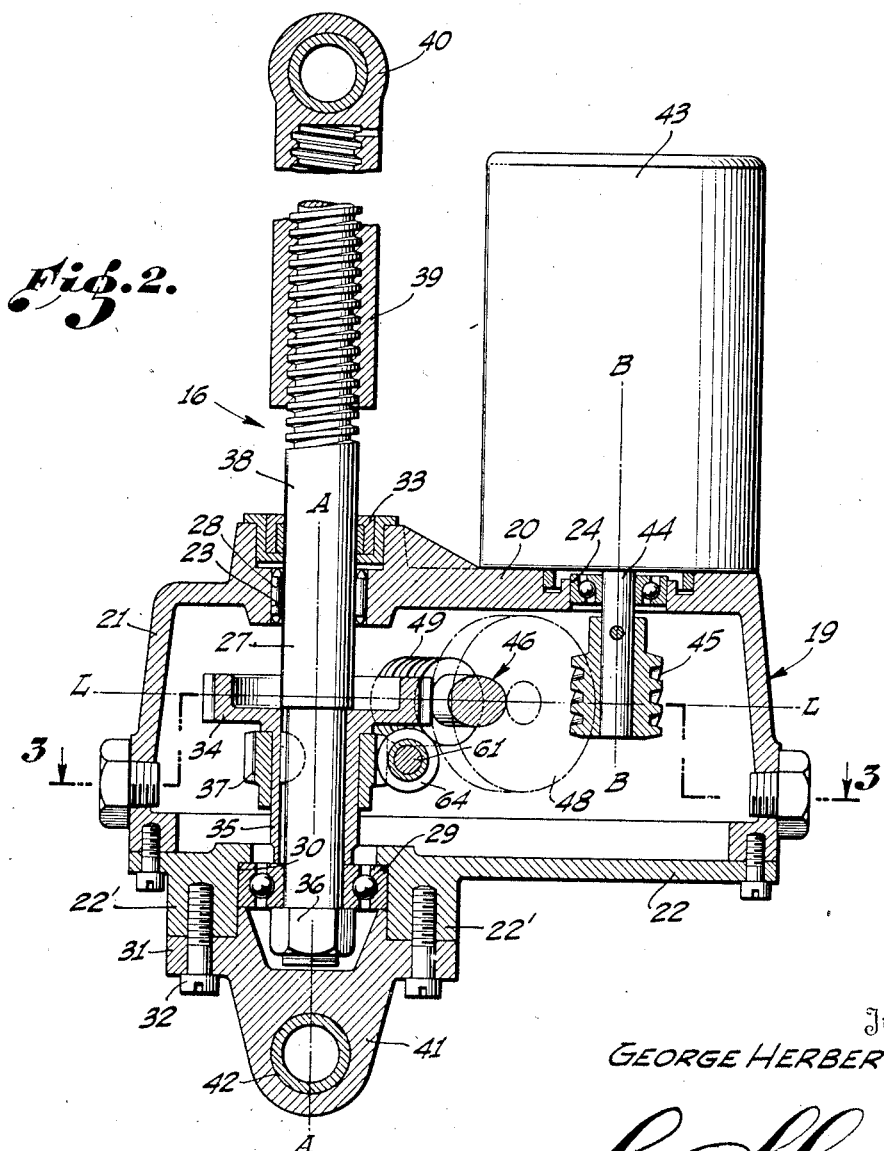
Fig. 2 is a longitudinal sectional view through the actuating device.
Figure 3:
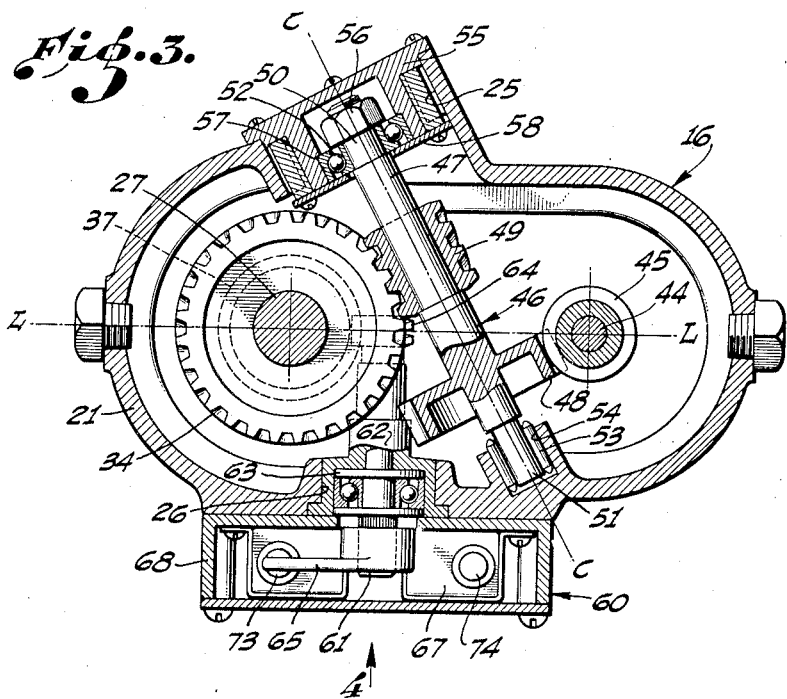
Fig. 3 is a section taken on a plane indicated by the line 3—3 of Fig. 2.

As further shown in Figs. 2 and 3, the actuating device 16 has a body or casing 19 comprising a front wall 20, a circumscribing side wall 21, and a cover plate 22 forming the rear wall of the casing 19. The front wall 20 of the casing has therein a shaft opening 23 and a motor opening 24, these openings 23 and 24 respectively defining a shaft axis A—A and a motor axis B—B substantially parallel thereto. In the side wall 21 of the casing there is a spindle opening 25 defining a spindle axis C—C which is disposed at an angle to the face of the wall 21 and is disposed at an acute angle to a line L—L, which intersects the axes A—A and B—B within the casing 19 and lies in a plane substantially perpendicular to the axes A—A and B—B. In the side wall 21 of the casing 19, opposite the spindle opening 25 there is a control shaft opening 26.

A shaft member 27 is disposed with its inner end projecting through the shaft opening 23. It is supported for rotation on the axis A—A by a bearing 28 in the opening 23, and by a bearing 29 which is secured in a counterbored opening 30 in the cover plate 22 by a cap 31 removably held in place by screws 32. The outer end of the opening 23 is counterbored to receive a grease seal 33.

A worm gear 34 is fixed on the inner portion of the shaft member 27, this gear 34 having a hub 35 against which the inner race of the bearing 29 is clamped by a nut 36 on the inner extremity of the shaft member 27, whereby the bearing 29 may support the axial thrust applied to the shaft member 27 during the operation of the actuating device. A worm 37 is secured on the hub 35. The portion 38 of the shaft member 27 which projects from the casing 19 cooperates with a screw member 39 in such manner that when the shaft member 27 is rotated and the member 39 is held against rotation, this member 39 will have movement along the axis A—A. To accomplish this result one of the parts 27 and 39 is internally threaded and the other of these parts is externally threaded. I prefer, however, to externally thread the projecting portion 38 of the shaft member 27 and to make the member 39 hollow with internal threads, as shown, to engage the threads of the shaft member 27. The screw member 39 has attachment means 40 in the form of a ring at the end thereof to receive a bolt whereby the member 39 may be swingably attached to the bracket 18 on the inner face of the wing flap 11. The casing 19 is provided with attachment means whereby it may be connected to the bracket 17, such attachment means comprising a lug 41 projecting on the axis A—A and having a bolt opening 42 therethrough.

A motor 43 is secured to the front wall 20 of the casing 19 in cooperative relation to the opening 24, and the shaft 44 of the motor 43 projects into the casing 19 along the axis B—B and on its inner end has a worm 45. A spindle assembly 46 is supported for rotation on the diagonal axis C—C. This spindle assembly 46 comprises a spindle 47, a gear 48 at one end thereof to mesh with the worm 45, a screw 49 near the other end thereof to mesh with the worm 34, and reduced end portions 50 and 51 extending through bearings 52 and 53, which support the spindle assembly in operative position within the shell or casing 19. The side wall 21 of the casing 19 has an internal recess 54 on the axis C—C, to receive the bearing 53 which is of simple radial type and is commonly referred to as a bevel bearing. The bearing 52 is of combined-radial-thrust type and is removably supported within the spindle opening 25 by means of a removable plug 55 which closes the opening 25. The inner race of the bearing 52 is fixed on the end 50 of the spindle 47 by a nut 56, and the inner portion of the plug 55 is provided with a counterbored recess 57 in which the outer race of the bearing 52 is clamped by a clamping ring 58, thereby supporting the bearing 52 so that it will serve as a means for limiting axial movement of the spindle assembly 46 and fixing the spindle assembly 46 in cooperative relation to the worm 45 and the gear 34.

The motor 43 is of reversible type, and although the motor at present employed at 43 in the practice of the invention is electrically operated, it is recognized that a fluid motor may be employed for this purpose. When the motor 43 is operated so as to drive the worm 45, the shaft member 27 will be rotated in a corresponding direction, and the screw member 39 will be moved axially, within the limits defined by the control means 60 now to be described. This control means 60 includes a control shaft 61 rotatably supported in a position projecting through the opening 26 by a bushing 62 having a grease seal 63 in the outer portion thereof. On the inner end of the shaft 61 there is a gear 64 which is meshed with the worm 37 whereby the shaft 61 will be rotated through a relatively small arc for each revolution of the shaft member 27.

Figure 4:
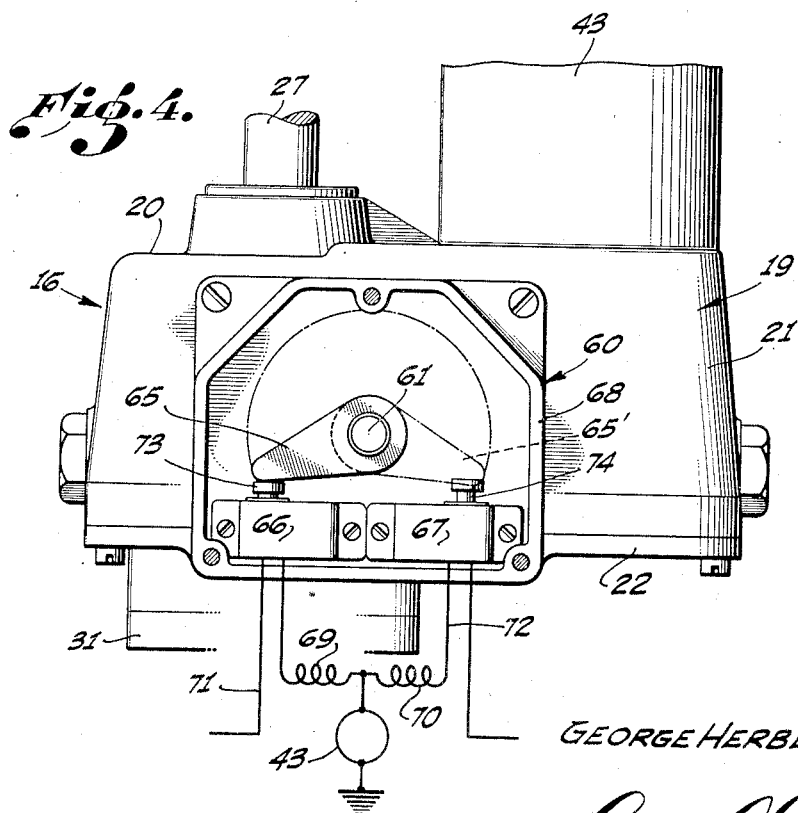
Fig. 4 is a face view of the control switch, with cover removed, taken from the position indicated by the arrow 4 of Fig. 3.

On the outer end of the shaft 61 I have shown a cam or lever 65 arranged for cooperation with limit controls 66 and 67 disposed within a housing 68 secured to the outer face of the side wall 21. Although the shaft 61 may be employed for the purpose of operating a follow-up switch mechanism in the housing 68, such as disclosed in my copending application for Electrical flap control, Serial No. 414,336, I have for the purpose of simplifying this disclosure indicated the control elements 66 and 67 as being limit switches, and in Fig. 4 have indicated the motor 43 diagrammatically as being of split field series reversible type having windings 69 and 70 in series with the separate control circuits 71 and 72, which also include the limit switches 66 and 67. When the motor 43 is energized through the circuit 71 containing the limit switch 66 and the field winding 69, the shaft 61 will be driven in anticlockwise direction until the lever 65 engages and depresses the actuating button or member 73 of the limit switch 66, as shown in Fig. 4, thereby actuating the limit switch 66 so as to open the circuit 71 and stop the motor. This occurs when the screw member 39 is at one limit of its axial movement, and when the limit switch 66 has been actuated as described, further energization of the motor 43 can occur only through the circuit 72, and this energization of the motor 43 through the circuit 72 may be continued until clockwise rotation of the shaft 61 brings the lever 65 into engagement with the actuating part 74 of the limit switch 67, as indicated by dotted lines 65', Fig. 4, whereupon the limit switch 67 will be actuated and the circuit 72 will be interrupted so that the motor will be stopped with the screw member 39 at the opposite end of its axial movement.

It will be noted that the maximum force exerted by the device is thrust, and that this thrust is transmitted directly through the bearing 29 to the lug 41 which in turn transmits the thrust to the bracket 17 along the projected axis of the screw 38. The mounting comprising the lug 41 and the adjacent wall 22' may be designed to transmit the operating stress and thrust of the screw 38, and the construction shown permits use of very light walls in the casing 19 and the cover member 22, which is highly desirable in aircraft work.

I claim as my invention:

1. In an actuating device of the character described, the combination of: a casing; a shaft member rotatably mounted in said casing, said shaft member being threaded; a screw member in overlapping relation to said shaft member and being in threaded engagement therewith so that relative rotation of said shaft member will cause movement of said screw member along the axis of said shaft member; a motor carried by said casing; gear means in said casing connecting the motor and the shaft member, for driving the shaft member; means connecting said screw member to the object to be moved; connecting means on said casing substantially on the projected axis of said shaft, to connect said casing to another object whereby driving of said shaft member by said motor will cause movement of said screw member and said first named object relatively to said shaft member and said second named object; switch means carried by said casing; a rotatable switch operating member carried by said casing; and reduction gear means driven by said motor to rotate said switch operating member in proportion to the rotation of said shaft member by said motor.

2. In an actuating device of the character described, the combination of: a casing; a shaft member rotatably mounted in said casing, said shaft member being threaded; a screw member in overlapping relation to said shaft member and being in threaded engagement therewith so that relative rotation of said shaft member will cause movement of said screw member along the axis of said shaft member; a motor carried by said casing; gear means in said casing connecting the motor and the shaft member, for driving the shaft member; means connecting said screw member to an object to be moved; connecting means on said casing substantially on the projected axis of said shaft, to connect said casing to another object, whereby driving of said shaft member by said motor will cause movement of said screw member and said first named object relatively to said shaft member and said second named object; motor control means carried by said casing; a movable operating member carried by said casing for operation of said motor control means; and transmission means driven by said motor so as to move said operating member proportionately to the rotary movement of said shaft member by said motor.

3. In an actuating device of the character described, the combination of: a casing; a shaft member rotatably mounted in said casing, said shaft member being threaded; a screw member in overlapping relation to said shaft member and being in threaded engagement therewith so that relative rotation of said shaft member will cause movement of said screw member along the axis of said shaft member; a motor carried by said casing; gear means in said casing connecting the motor and the shaft member, for driving the shaft member; means connecting said screw member to an object to be moved; connecting means on said casing to connect said casing to another object, whereby driving of said shaft member by said motor will cause movement of said screw member and said first named object relatively to said shaft member and said second named object; switch means carried by said casing; a rotatable switch operating member carried by said casing; and reduction gear means driven by said motor to rotate said switch operating member in proportion to the rotation of said shaft member by said motor.

4. In an actuating device of the character described, the combination of: a casing; a shaft member rotatably mounted in said casing, said shaft member being threaded; a screw member in overlapping relation to said shaft member and being in threaded engagement therewith so that relative rotation of said shaft member will cause movement of said screw member along the axis of said shaft member; a motor carried by said casing; gear means in said casing connecting the motor and the shaft member, for driving the shaft member; means connecting said screw member to an object to be moved; connecting means on said casing to connect said casing to another object, whereby driving of said shaft member by said motor will cause movement of said screw member and said first named object relatively to said shaft member and said second named object; motor control means carried by said casing; a movable operating member carried by said casing for operation of said motor controlled means; and transmission means driven by said motor so as to move said operating member proportionately to the rotary movement of said shaft member by said motor.

5. In an actuating device of the character described, the combination of: a casing; a shaft member rotatably mounted in said casing, said shaft member being threaded; a screw member in overlapping relation to said shaft member and being in threaded engagement therewith so that relative rotation of said shaft member will cause movement of said screw member along the axis of said shaft member; a motor carried by said casing in a position adjacent said projecting portion of said shaft member, said motor having a shaft, the axis of which is parallel to the axis of said shaft member; a worm fixed on said motor shaft in said casing; a spindle supported in said casing in a plane transverse to the axes of said motor and said shaft member; a gear fixed on said spindle and meshed with said worm so that the spindle will be driven thereby; a worm and gear set connecting said spindle to said shaft member to drive the same from said spindle; means connecting said screw member to an object to be moved; connecting means on said casing to connect said casing to another object, whereby driving of said shaft member by said motor will cause movement of said screw member and said first named object relatively to said shaft member and said second named object; a switch actuating shaft disposed in crossing relation to said shaft member and projecting through the wall of said casing to drive a part located exteriorly of said casing; and a worm and gear set forming a drive connection from said shaft member to the inner end of said switch actuating shaft.

6. In an actuating device of the character described, the combination of: a casing; a shaft member rotatably mounted in said casing, said shaft member being threaded; a screw member in overlapping relation to said shaft member and being in threaded engagement therewith so that relative rotation of said shaft member will cause movement of said screw member along the axis of said shaft member; a motor carried by said casing in a position adjacent said projecting portion of said shaft member, said motor having a shaft, the axis of which is parallel to the axis of said shaft member; a worm fixed on said motor shaft in said casing; a spindle rotatably supported in said casing in a plane transverse to the axis of said shaft member and at an acute angle to a line drawn in said plane so as to intersect the axes of said shaft member and said motor shaft; a gear fixed on said spindle and meshed with said worm so that the spindle will be driven thereby; a worm and gear set connecting said spindle to said shaft member to drive the same from said spindle; means connecting said screw member to an object to be moved; connecting means on said casing to connect said casing to another object, whereby driving of said shaft member by said motor will cause movement of said screw member and said first named object relatively to said shaft member and said second named object; a switch actuating shaft disposed in crossing relation to said shaft member and projecting through the wall of said casing to drive a part located exteriorly of said casing; and a worm and gear set forming a drive connection from said shaft member to the inner end of said switch actuating shaft.

7. In an actuating device of the character described, the combination of: a casing having a shaft opening and a motor opening in its front wall in spaced relation and defining a shaft axis and a motor axis which are in general coextensive, an opening passing through the side wall of the casing at an angle to the face of said side wall and defining in said casing a spindle axis disposed at an angle to a line which intersects said shaft and motor axes at angles of substantially 90° and an opening through the wall of said casing defining a control shaft axis; a shaft member extending through said shaft opening and being supported in said casing so as to rotate on said shaft axis, said shaft member being threaded; a screw member in overlapping relation to said shaft member and being in threaded engagement therewith so that relative rotation of said shaft member will cause movement of said screw member along the axis of said shaft member; a motor mounted on said casing with its shaft projecting through said motor opening and on said motor axis; a worm fixed on the inner end of said motor shaft; a gear fixed on said shaft member within said casing; a spindle assembly insertable through said spindle opening into said casing and on said spindle axis, said spindle assembly having a gear to mesh with said worm on said motor shaft and a worm to mesh with said gear on said shaft member; a bearing removably supported in said spindle opening and rotatably supporting one end of said spindle assembly; a bearing carried by said casing on said spindle axis and rotatably supporting the other end of said spindle assembly; a control shaft rotatably supported in a position projecting through said control shaft opening; a worm and gear set in said casing connecting said shaft member with said control shaft so that said control shaft will be rotated at a speed which is a proportion of the rotation of said shaft member; means connecting said screw member to an object to be moved; and connecting means on said casing to connect said casing to another object, whereby driving of said shaft member by said motor will cause movement of said screw member and said first named object relatively to said shaft member and said second named object.

8. In an actuating device of the character described, the combination of: a casing; a shaft member rotatably mounted in said casing, said shaft member being threaded; a screw member in overlapping relation to said shaft member and being in threaded engagement therewith so that relative rotation of said shaft member will cause movement of said screw member along the axis of said shaft member; a motor carried by said casing; gear means in said casing connecting the motor and the shaft member, for driving the shaft member; means connecting said screw member to an object to be moved; connecting means on said casing to connect said casing to another object, whereby driving of said shaft member by said motor will cause movement of said screw member and said first named object relatively to said shaft member and said second named object; motor control means carried by said casing, said motor control means comprising a pair of switches which are both in active condition when said screw member is in an intermediate position; a movable operating member carried by said casing for operation of said motor control means, said operating means being movable between two extreme positions in one of which it renders one of said switches inactive and in the other of which positions renders the other of said switches inactive; and transmission means driven by said motor so as to move said operating member proportionately to the rotary movement of said shaft member by said motor.

GEORGE HERBERT GILL.